US012755999B2

(12) United States Patent
Kinugawa et al.

(10) Patent No.: US 12,755,999 B2
(45) Date of Patent: Oct. 6, 2026

(54) PRODUCTION DEVICE FOR RESIN FRAMED ELECTRODE FOIL

(71) Applicant: KABUSHIKI KAISHA TOYOTA JIDOSHOKKI, Kariya (JP)

(72) Inventors: Tatsuya Kinugawa, Kariya (JP); Shinya Asai, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 511 days.

(21) Appl. No.: 18/287,955

(22) PCT Filed: Feb. 4, 2022

(86) PCT No.: PCT/JP2022/004553
§ 371 (c)(1),
(2) Date: Oct. 23, 2023

(87) PCT Pub. No.: WO2022/239332
PCT Pub. Date: Nov. 17, 2022

(65) Prior Publication Data

US 2024/0222678 A1 Jul. 4, 2024

(30) Foreign Application Priority Data

May 13, 2021 (JP) ................................ 2021-081573

(51) Int. Cl.
*H01M 10/052* (2010.01)
*H01M 10/04* (2006.01)
*H01M 10/0585* (2010.01)
*H01M 50/186* (2021.01)

(52) U.S. Cl.
CPC .................................. *H01M 10/04* (2013.01)

(58) Field of Classification Search
CPC ........................... H01M 10/04; H01M 50/186
See application file for complete search history.

(56) References Cited

FOREIGN PATENT DOCUMENTS

JP 2018190535 A * 11/2018
JP 2020-95909 A 6/2020

OTHER PUBLICATIONS

Machine translation of Yoshida JP2018190535A, Nov. 29, 2018 (Year: 2018).*
International Search Report for PCT/JP2022/004553 dated Apr. 12, 2022.
Written Opinion for PCT/JP2022/004553 dated Apr. 12, 2022.

* cited by examiner

*Primary Examiner* — Christopher P Domone
*Assistant Examiner* — Fiki Vanessa Owhoso
(74) *Attorney, Agent, or Firm* — Sughrue Mion, PLLC

(57) ABSTRACT

A production device for a resin framed electrode foil includes a pair of holding members connected to each other via a rotary shaft extending along an edge portion of an electrode foil and configured to hold a resin frame, and a welding member or a plurality of welding members provided in each of the pair of holding members. Each of the pair of holding members is movable between a receiving position in which the resin frame is received from an external supply device and a welding position in which the resin frame is welded to the edge portion of the electrode foil by the welding member, with rotation of the rotary shaft around an axis. When one of the pair of holding members is in the welding position, the other of the pair of the holding members is in the receiving position.

4 Claims, 4 Drawing Sheets

PRODUCTION DEVICE FOR RESIN FRAMED ELECTRODE FOIL

CROSS REFERENCE TO RELATED APPLICATIONS

This application is a National Stage of International Application No. PCT/JP2022/004553 filed Feb. 4, 2022, claiming priority based on Japanese Patent Application No. 2021-081573 filed May 13, 2021, the contents of all of which are incorporated herein by reference in their entirety.

TECHNICAL FIELD

The present disclosure relates to a production device for a resin framed electrode foil.

BACKGROUND ART

As a constituting element of a power storage module, in some cases, a resin framed electrode foil that has a resin frame welded to an edge portion of an electrode foil is used. For example, Patent Document 1 discloses a method of producing a power storage module as a technique related to production of the resin framed electrode foil. In the method of producing the power storage module of Patent Document 1, a resin frame is temporarily attached to a peripheral portion of a first surface of the electrode foil constituting a bipolar electrode. Then, a heater and a press roller cooperate to perform final-welding of the resin frame to the peripheral portion of the first surface of the electrode foil to form a bipolar electrode unit.

CITATION LIST

Patent Literature

[Patent Document 1] Japanese Patent Application Publication No. 2020-95909

SUMMARY OF THE INVENTION

Technical Problem

In view of reducing the cost of the power storage module, there is a demand for increasing the productivity in producing the resin framed electrode foil. However, in order to weld resin frames to electrode foils which are supplied successively, a device for welding is required to alternately repeat a welding operation in which the resin frame is welded to the electrode foil and a receiving operation in which a resin frame to be used for the next welding is received. In this case, shifting from the welding operation to receiving operation takes time, in addition to time for the welding operation and the receiving operation themselves, which limits improvement in the productivity in producing the resin framed electrode foil.

The present disclosure, which has been made to solve the above-described problem, is directed to providing a production device that improves the productivity in producing a resin framed electrode foil.

Solution to Problem

A production device for a resin framed electrode foil according to one aspect of the present disclosure, which is configured to weld a resin frame to an edge portion of an electrode foil, includes a pair of holding members connected to each other via a rotary shaft that extends along the edge portion of the electrode foil and configured to hold the resin frame, a welding member or a plurality of welding members provided in each of the pair of holding members, wherein each of the pair of holding members is movable to a receiving position where the resin frame is received from an external supply device and a welding position where the welding member welds the resin frame to the edge portion of the electrode foil, and when one of the pair of holding members is in the welding position, the other of the pair of holding members is in the receiving position.

In this production device for the resin framed electrode foil, when one of the pair of holding members is in the welding position where the resin frame is welded, the other of the pair of the holding members is in the receiving position where the resin frame is received. Thus, when one of the holding members is shifted to the receiving position after the one of the holding members welds a resin frame to the electrode foil in the welding position, the other of the holding members which is already in the receiving position may quickly receive a resin frame for next welding. Therefore, a cycle in which each of the pair of holding members is shifted from the welding position to the receiving position is shortened, and the productivity in producing the resin framed electrode foil may be improved. In addition, a configuration using the rotary shaft allows shifting the pair of holding members between the welding position and the receiving position to be accomplished in a limited space, which allows the device to be downsized.

While one of the pair of holding members welds the resin frame, the other of the pair of holding members may receive a resin frame to be used at next welding from the external supply device. In this case, since the resin frame to be used at the next welding is received during the welding, productivity in producing a resin framed electrode foil may be increased.

The electrode foil has a first surface and a second surface opposite from the first surface, a pair of holding members is provided on the first surface side and the second surface side, and the electrode foil, the resin frame on the edge portion of the electrode foil on the first surface, and the resin frame on the edge portion of the electrode foil on the second surface are held by the holding member in the welding position on the first surface side and the holding member in the welding position on the second surface side. In this case, when the resin frame is welded, opposite surfaces of the electrode foil are held by the holding members, which suppresses warping of the electrode foil.

A position of a welding member of the holding member in the welding position on the first surface side and a position of a welding member of the holding member in the welding position on the second surface side may be symmetric across the electrode foil. As a result, when the resin frame is welded, heat is applied from the welding members to the same parts of the electrode foil on the opposite surfaces thereof, which increases the welding speed.

Advantageous Effects of Invention

According to the present disclosure, the productivity in producing a resin framed electrode foil is increased.

BRIEF DESCRIPTION OF DRAWINGS

FIG. 2A is a view as viewed from a first surface side, and FIG. 2B is a view as viewed from a second surface side.

DESCRIPTION OF EMBODIMENTS

Hereinafter, a preferred embodiment of a production device for a resin framed electrode foil according to one aspect of the present disclosure will be described with reference to the drawings.

Figure 1:
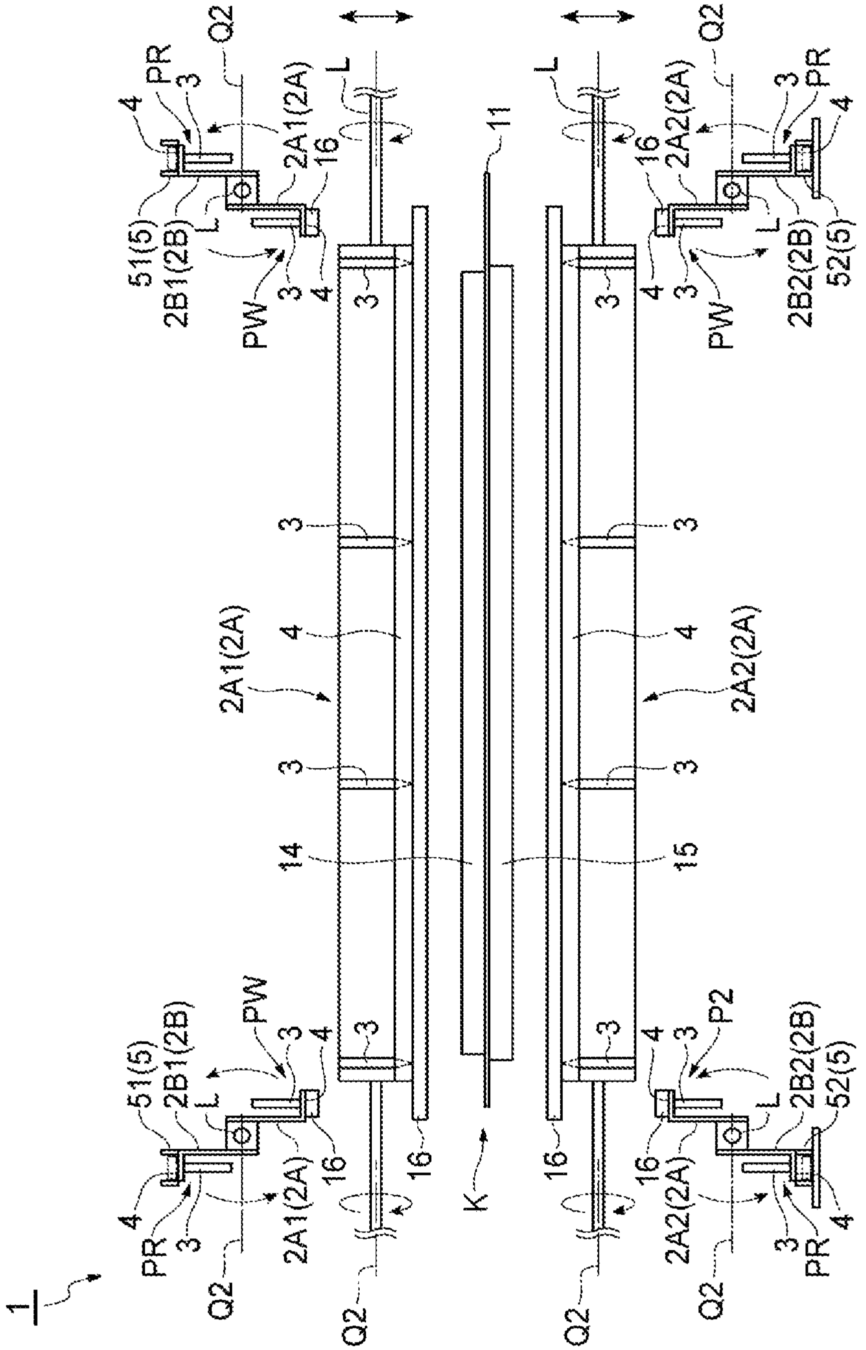
FIG. 1 is a schematic side view of a production device for a resin framed electrode foil according to an embodiment of the present disclosure.

FIG. 1 is a schematic side view of a production device for a resin framed electrode foil according to an embodiment of the present disclosure. In the present embodiment, a production device 1 is configured to perform tack-welding of a resin frame 12 to an electrode foil 11. The production device 1 may be incorporated in a production line of a power storage module using the resin framed electrode foil, before a welding device that performs final-welding of the resin frame 12 to edge portions 11*a* of the electrode foil 11.

Figure 2A:
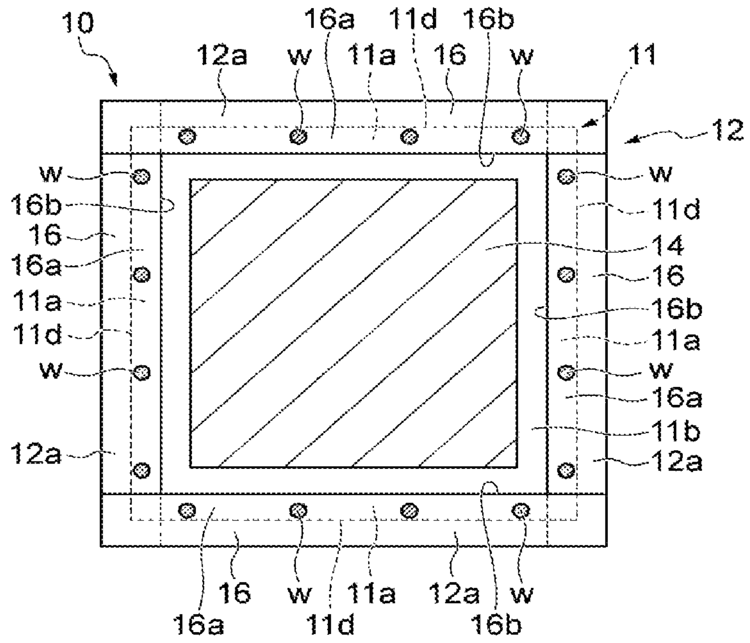
FIGS. 2A and 2B are views schematically illustrating a configuration example of a resin framed electrode foil produced by the production device illustrated in FIG. 1.
Figure 2B:
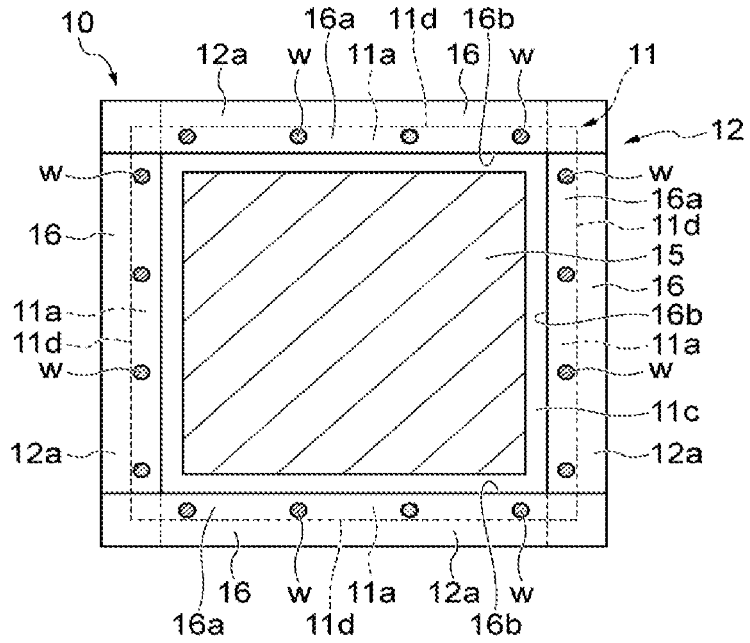

Firstly, a resin framed electrode foil 10 produced by the production device 1 will be described. The resin framed electrode foil 10 here is formed in a state where the resin frame 12 is tack-welded to the edge portions 11*a* of the electrode foil 11, as illustrated in FIGS. 2A and 2B. The electrode foil 11 is a member constituting a bipolar electrode, for example, and has a rectangular shape in a plan view. The electrode foil 11 has a first surface 11*b*, a second surface 11*c* on the opposite from the first surface 11*b*. A positive electrode active material layer 14 is formed on the first surface 11*b* of the electrode foil 11, and a negative electrode active material layer 15 is formed on the second surface 11*c* of the electrode foil 11.

A positive electrode of the bipolar electrode is formed by the electrode foil 11 and the positive electrode active material layer 14 formed on the first surface 11*b* of the electrode foil 11. A negative electrode of the bipolar electrode is formed by the electrode foil 11 and the negative electrode active material layer 15 formed on the second surface 11*c* of the electrode foil 11. Examples of the electrode foil 11 include a copper foil, an aluminum foil, a titanium foil, and nickel foil. The electrode foil 11 may be an alloy foil of the above metals. The electrode foil 11 may be made out of a plurality of foils integrated together or made of a foil plated with another metal on the surface.

The positive electrode active material layer 14 is a layer member including a positive electrode active material, a conductive assistant, and a binder. Examples of the positive electrode active material include composite oxides, lithium metal, and sulfur. The composition of the composite oxide includes at least one of iron, manganese, titanium, nickel, cobalt, and aluminum, and lithium, for example. An example of the composite oxide is olivine type lithium iron phosphate ($LiFePO4$).

The negative electrode active material layer 15 is a layer member including a negative electrode active material, a conductive assistant, and a binder.

Examples of the negative electrode active material include carbon such as graphite, artificial graphite, highly-oriented graphite, mesocarbon microbeads, hard carbon, and soft carbon, metal compounds, elements that can be alloyed with lithium or compounds thereof, and boron-added carbon. Example of elements that can be alloyed with lithium include silicon and tin. As a conduction assistant and a binder, those the same as those used for the positive electrode active material layer 14 may be used.

The resin frame 12 has a rectangular frame shape extending along the outline of the electrode foil 11 in a plan view. The resin frame 12 is disposed such that the resin frame 12 surrounds the positive electrode active material layer 14 or the negative electrode active material layer 15. In the present embodiment, the resin frame 12 is disposed on each of the first surface 11*b* and the second surface 11*c* of the electrode foil 11, as illustrated in FIGS. 2A and 2B. The resin frame 12 on the first surface 11*b* and the resin frame 12 on the second surface 11*c* are symmetrically positioned across the electrode foil 11. The resin frame 12 is made of resin having heat resistance and corrosion resistance to electrolyte, for example. Examples of this type of resin include polyimide, polypropylene (PP), polyphenylene sulfide (PPS), and modified polyphenylene ether (modified PPE).

In examples illustrated in FIGS. 2A and 2B, the resin frame 12 has extended portions 12*a* extending out from outer edges 11*d* of the electrode foil 11. In a power storage module production process, the resin framed electrode foils 10 each having the resin frames 12 attached by final-welding are stacked with a separator interposed therebetween to form a stacked body. After the stacked body is formed, the extending portions 12*a* of the resin frames 12 disposed side by side in the stacking direction may be welded to each other. Welding the extending portions 12*a* of the resin frames 12 disposed side by side in the stacking direction allows a space between the resin framed electrode foils 10 disposed side by side in the stacking direction and including the positive electrode active material layer 14 and the negative electrode active material layer 15 to be sealed.

In the present embodiment, the resin frame 12 in a tack-welded state includes four resin pieces 16 each having a strip shape (sides of the resin frame 12) corresponding to four sides of the electrode foil 11. The four resin pieces 16 each having a strip shape are disposed such that ends of the resin pieces 16 in the longitudinal direction are overlapped, which defines the resin frame 12 having a rectangular shape as a whole. Parts where the ends of the resin pieces 16 extending along sides of the resin frame 12 next to each other are overlapped with each other are positioned at corners of the resin frame 12. As illustrated in FIGS. 2A and 2B, positions of tack-welded portions W of the resin pieces 16 on the first surface 11*b* side of the electrode foil 11 and positions of tack-welded portions W of the resin pieces 16 on the second surface 11*c* side of the electrode foil 11 are symmetric across the electrode foil 11.

In the present embodiment, the tack-welded portions W are disposed at positions avoiding the corners of the resin frame 12 where the ends of the resin pieces 16 extending along sides of the resin frame 12 next to each other are overlapped with each other. In examples illustrated in FIGS. 2A and 2B, the tack-welded portions W are provided at four positions in total at regular intervals in each of the resin pieces 16 in the longitudinal direction. Specifically, two of the tack-welded portions W are located at two positions closer to the center of each of the resin pieces 16 than the parts where the ends of the resin pieces 16 extending along sides of the resin frame 12 next to each other are overlapped with each other are and near the corners of the resin frame 12, and the other two of the tack-welded portions W are located between the previously described two of the tack-welded portions W.

In addition, in the present embodiment, the tack-welded portions W are located at positions close to the outer edges 11*d* of the electrode foil 11 in body portions 16*a* of the resin pieces 16 overlapping with the edge portions 11*a* of the electrode foil 11. Specifically, a center of each of the tack-welded portions W is located, in the body portion 16*a* of each of the resin pieces 16, at a position close to the outer edge 11*d* of the electrode foil 11 than an inner edge 16*b* of the body portion 16*a* is. This suppresses rolling up of the resin frame 12 from the electrode foil 11, and increases ease of handling of the resin framed electrode foil 10 in the tack-welded state.

The following will describe a configuration of the production device 1 that produces the resin framed electrode foil 10 in the tack-welded state. As illustrated in FIG. 1, the production device 1 includes a pair of holding members 2A, 2B that are connected to each other to hold the resin frame 12, and a welding member 3 or a plurality of welding members 3 provided in each of the pair of holding members 2A, 2B. A supply position K where the electrode foil 11 to be welded is supplied is set in the production device 1.

The electrode foil 11 is supplied from an external supply device to the supply position K, which is held by a holding member (not illustrated). At the supply position K, for example, a central portion of the electrode foil 11 is held, and the edge portions 11*a* of the electrode foil 11 to which the resin frame 12 is welded is left free. Although there are no restrictions for a method for holding the electrode foil 11 at the supply position K, for example, clamping using a magnet may be used. In the example illustrated in FIG. 1, the electrode foil 11 supplied to the supply position K is positioned such that the first surface 11*b* faces upward in the vertical direction and the second surface 11*c* faces downward in the vertical direction.

In the present embodiment, the production device 1 tack-welds the resin pieces 16 each having a strip shape to four sides of the electrode foil 11 having a rectangular shape on each of the first surface 11*b* and the second surface 11*c*. Thus, eight pairs of holding members 2A, 2B in total are disposed for the electrode foil 11 supplied to the supply position K. Specifically, four pairs of holding members 2A, 2B corresponding to four edge portions 11*a* of the electrode foil 11 on the first surface 11*b* side, and four pairs of holding members 2A, 2B corresponding four edge portions 11*a* of the electrode foil 11 on the second surface 11*c* side of the electrode foil 11 are disposed. Each of the holding members 2A, 2B has a suction plate 4.

The suction plate 4 has, for example, a band shape corresponding to a shape of the resin piece 16, and has a suction surface in which a plurality of suction holes is formed. The suction plate 4 is connected to a negative pressure source through a pipe (not illustrated) and is configured to suction the resin pieces 16 with negative pressure. The suction plate 4 is not limited to a configuration in which suctioning is performed by negative pressure, but may be a configuration in which suctioning is performed by other means such as static electricity.

In the following description, for convenience in distinguishing the pairs of holding members 2A, 2B on the first surface 11*b* side and the pair of holding members 2A, 2B on the second surface 11*c* side of the electrode foil 11 supplied to the supply position K, the pair of holding members 2A, 2B on the first surface 11*b* side may be referred to as a pair of first surface holding members 2A1, 2B1, and the pair of holding members 2A, 2B on the second surface 11*c* side may be referred to as a pair of second surface holding members 2A2, 2B2.

The welding members 3 are heaters that perform spot-welding of the resin pieces 16 to the electrode foil 11. The welding members 3 are disposed at positions corresponding to positions where the tack-welded portions W are to be formed, the tack-welded portions W being portions where the resin pieces 16 are welded to the edge portion 11*a* of the electrode foil 11. In the present embodiment, as illustrated in FIGS. 2A and 2B, the positions of the tack-welded portions W of the resin pieces 16 on the first surface 11*b* side of the electrode foil 11 and the positions of the tack-welded portions W of the resin pieces 16 on the second surface 11*c* side of the electrode foil 11 are symmetric across the electrode foil 11. Therefore, at the supply position K of the electrode foil 11, the welding members 3 of the holding members 2A, 2B on the first surface 11*b* side and the welding members 3 of the holding members 2A, 2B on the second surface 11*c* side are symmetrical across the electrode foil 11.

In the present embodiment, as illustrated in FIGS. 2A and 2B, the tack-welded portions W are formed at four locations at regular intervals in each of the resin pieces 16. Thus, each of the pair of holding members 2A, 2B has four welding members 3 to form the tack-welded portions W disposed at regular intervals along the longitudinal direction of the suction plate 4.

As illustrated in FIG. 1, each of the pair of holding members 2A, 2B is disposed around an axis of its associated one of a plurality of rotary shafts L extending along the edge portions 11*a* of the electrode foil 11. The holding members 2A, 2B, which are paired, are connected to each other via the rotary shaft L. Each of the rotary shafts L extends along its associated one of the edge portions 11*a* (the outer edges 11*d*) of the electrode foil 11 supplied to the supply position K, and is rotatable around the axis by a motor or other driving means. The rotation of the rotary shaft L allows the pair of holding members 2A, 2B to shift between a receiving position PR in which the resin frame 12 (resin pieces 16) is received from the external supply device (not illustrated), and a welding position PW in which the resin frame 12 (resin pieces 16) is welded to the edge portions 11*a* of the electrode foil 11 by the welding members 3.

In one of the pair of holding members 2A, 2B in the receiving position PR, the suction plate 4 is positioned more distant from the electrode foil 11 than the rotary shaft L is, and faces the external supply device (the opposite from the electrode foil 11 supplied to the supply position K in the example illustrated in FIG. 1). In the other of the pair of holding members 2A, 2B in the welding position PW, the suction plate 4 is positioned closer to the electrode foil 11 than the rotary shaft L is and faces the edge portion 11*a* of the electrode foil 11 supplied to the feeding position K. The one of the pair of holding members 2A, 2B in the welding position PW and the other of the pair of holding members 2A, 2B in the receiving position PR are rotation symmetric with respect to the rotary shaft L (2-fold symmetric in FIG. 1). Accordingly, when one of the pair of holding members 2A, 2B is in the welding position PW, the other of the pair of holding members 2A, 2B is in the receiving position PR.

Figure 3:
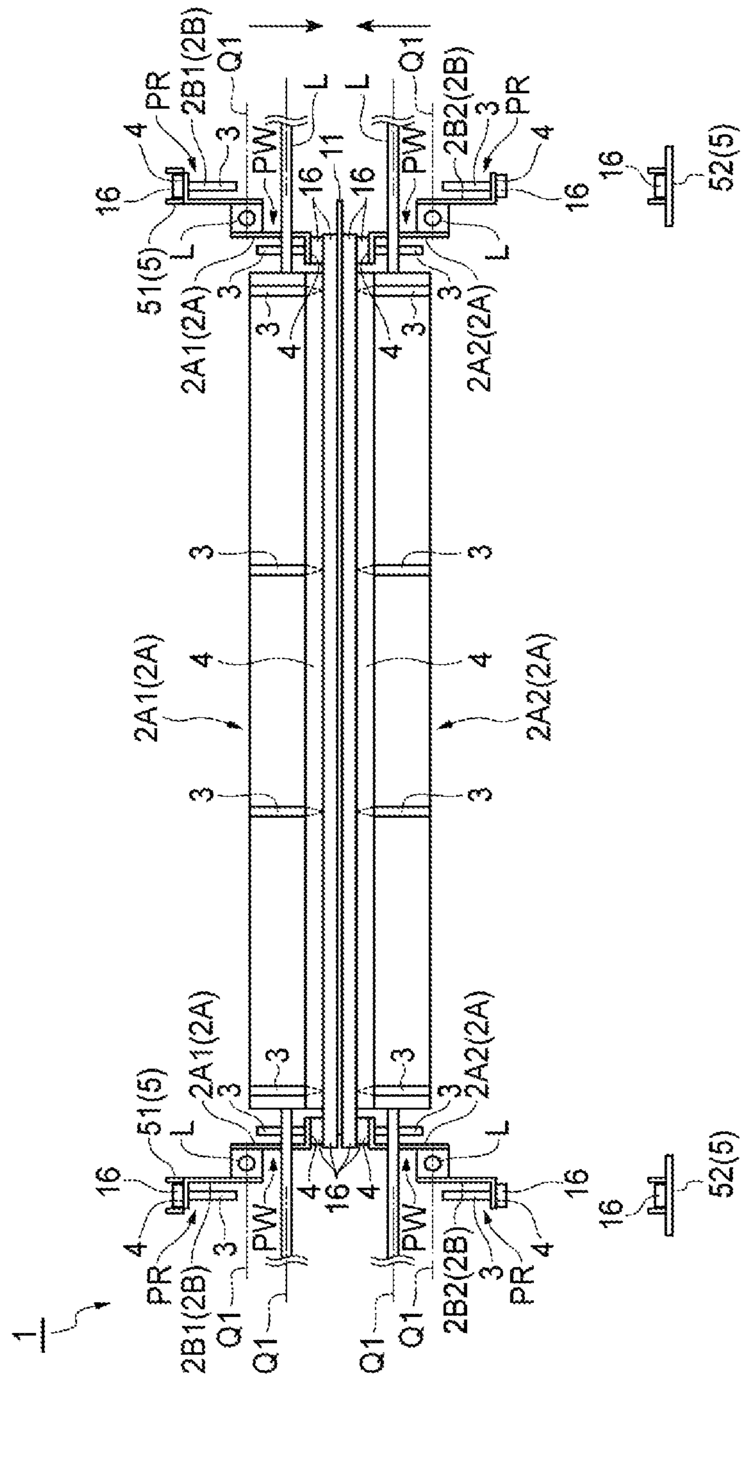
FIG. 3 is a schematic side view illustrating an operation of the production device.

In the present embodiment, the pair of holding members 2A, 2B is movable, together with the rotary shaft L, between a nearby position Q1 (see FIG. 3) where the pair of holding members 2A, 2B approaches the electrode foil 11 supplied to the supply position K and a distant position Q2 where the pair of holding members 2A, 2B is distant from the electrode foil 11 supplied to the supply position K. When the pair of holding members 2A, 2B and the rotary shaft L are positioned at the nearby position Q1, the resin piece 16 held by one of the suction plates 4 of the pair of holding members 2A, 2B in the welding position PW is pressed against the edge portion 11*a* of the electrode foil 11 supplied to the supply position K.

While the pair of holding members 2A, 2B and the rotary shaft L are moving to the nearby position Q1 from the distant position Q2, one of the pair of holding members 2A, 2B in the welding position PW takes a welding preparation position. The suction plate 4 of the one of the pair of holding members 2A, 2B taking the welding preparation position is positioned closer to the electrode foil 11 than the rotary shaft L is, and faces the edge portion 11*a* of the electrode foil 11. The resin piece 16 held by the suction plate 4 of the one of the pair of holding members 2A, 2B taking the welding preparation position is positioned away from the edge portion 11*a* of the electrode foil 11 supplied to the supply position K.

The external supply device includes a plurality of guide members 5 that guides the resin pieces 16 to be supplied to the production device 1 to the suction plates 4. Each of the guide members 5 includes a first surface guide member 51 corresponding to the first surface holding members 2A1, 2B1, and a second surface guide member 52 corresponding to the second surface holding members 2A2, 2B2. The first surface guide member 51 is formed by a pair of walls that restricts movement of the resin pieces 16 in the short side direction, for example. The first surface guide member 51 is positioned close to one of the suction plates 4 of the first surface holding members 2A1, 2B1 in the receiving position PR. The first surface guide member 51 moves in conjunction with movement of the first surface holding members 2A1, 2B1 between the nearby position Q1 and the distant position Q2 along one of the suction plates 4 of the first surface holding members 2A1, 2B1 in the receiving position PR.

The second surface guide member 52 is formed by a pair of walls that restricts movement of the resin pieces 16 in the short side direction, and a bottom wall connecting the pair of walls, for example. The second surface guide member 52 is disposed close to the second surface holding members 2A2, 2B2 in the distant position Q2 such that one of the suction plates 4 of the second surface holding member 2A2, 2B2 in the receiving position PR and the bottom wall face each other. The position of the second surface guide member 52 is fixed, and the second surface guide member 52 does not move in conjunction with movement of the second surface holding members 2A2, 2B2 between the nearby position Q1 and the distant position Q2.

Next, an operation of the above-described production device 1 will be described. In a state illustrated in FIG. 3, the holding member 2A is in the welding position PW and the holding member 2B is in the receiving position PR in each of the total of eight pairs of holding members 2A, 2B. Additionally, in the state illustrated in FIG. 3, the electrode foil 11 to be welded is supplied to the supply position K from the external supply device, and all of the pairs of holding members 2A, 2B move together with their associated rotary shafts L from the distant positions Q2 to the nearby positions Q1. The resin piece 16 held by each of the suction plate 4 of the holding members 2A in the welding position PW is pressed against its associated edge portion 11*a* of the electrode foil 11 supplied to the supply position K.

Four pairs of first surface holding members 2A1, 2B1 and four pairs of the second surface holding members 2A2, 2B2 move, together with their associated rotary shafts L, from the distant positions Q2 to the nearby positions Q1 at the same timing. Thus, a total of eight resin pieces 16 are pressed against the four sides of the electrode foil 11 on the first surface 11*b* and the second surface 11*c*. The electrode foil 11, the resin pieces 16 of the four sides of the electrode foil 11 on the first surface 11*b*, and the resin pieces 16 of the four sides of the electrode foil 11 on the second surface 11*c* are held by the four first surface holding members 2A1 and the four second surface holding members 2A2.

In a state where the electrode foil 11 and the resin pieces 16 are held by the first surface holding members 2A1 and the second surface holding members 2A2, spot-welding of the resin pieces 16 to the edge portions 11*a* of the electrode foil 11 is performed by the welding members 3. As has been described, in the present embodiment, the positions of the welding members 3 of the first surface holding members 2A1 and the positions of the welding members 3 of the second surface holding members 2A2 are symmetric across the electrode foil 11 in the supply position K of the electrode foil 11. As a result, heat is applied from the welding members 3 to the same positions of the resin pieces 16 on the first surface 11*b* side of the electrode foil 11 and the resin pieces 16 on the second surface 11*c* side of the electrode foil 11 as viewed in the thickness direction of the electrode foil 11. Spot-welding by the welding members 3 forms the electrode foil 11 with the resin pieces in a tack-welded state, as illustrated in FIGS. 2A and 2B.

When the pairs of holding members 2A, 2B moves together with the rotary shafts L to the nearby position Q1 and welding of the resin pieces 16 to the electrode foil 11 is performed, the resin pieces 16 to be used at the next welding are supplied from the external supply device to the first surface holding member 2B1 and the second surface guide member 52 in the receiving position PR. The resin piece 16 supplied to the first surface holding member 2B1 is delivered to the first surface holding member 2B1 with the position of the resin piece 16 secured by the walls of the first surface guide member 51 and held by the suction plate 4 of the first surface holding member 2B1. The resin piece 16 supplied to the second surface guide member 52 is temporarily placed on the bottom wall of the second surface guide member 52 with the position of the resin piece 16 secured by the walls of the second surface guide member 52.

Figure 4:
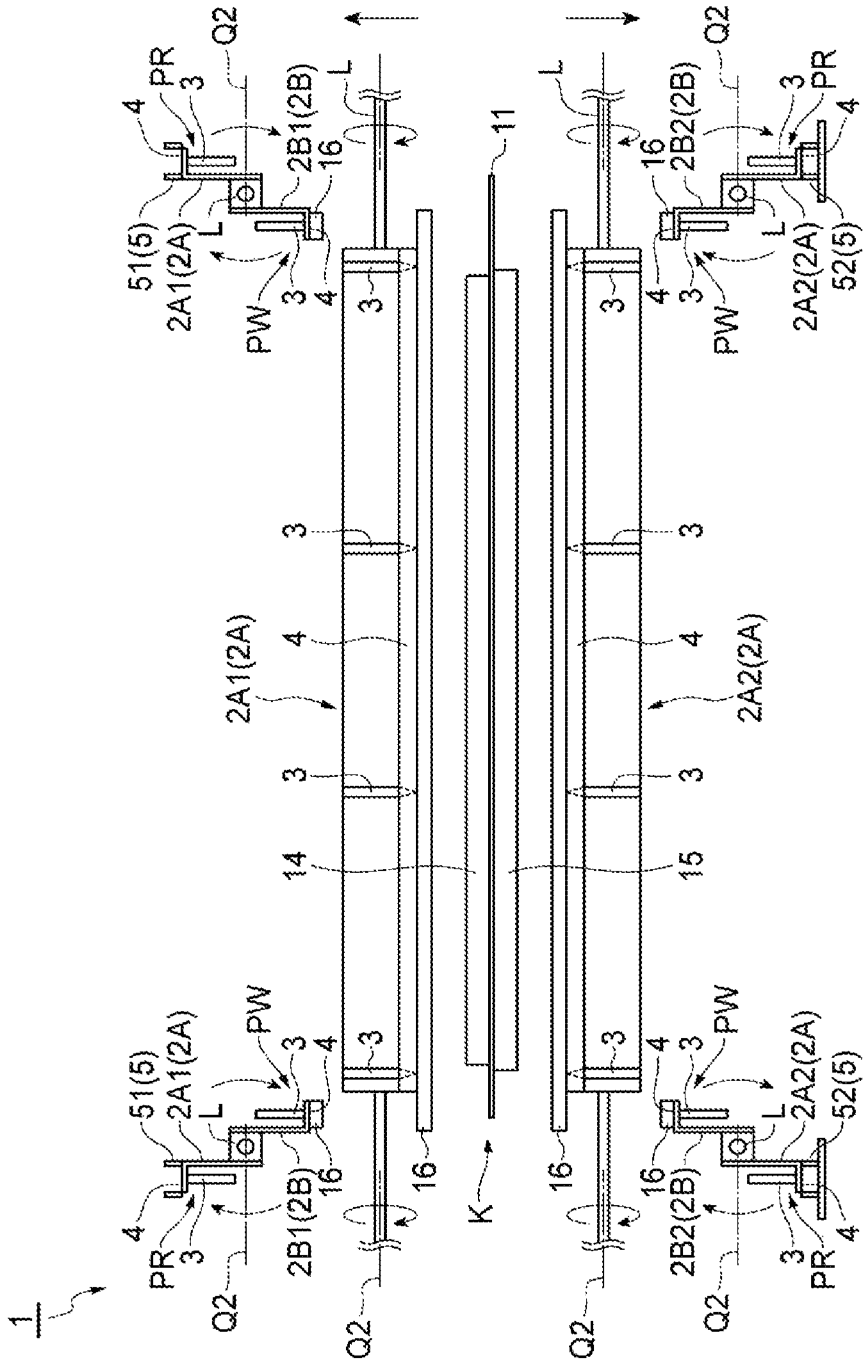
FIG. 4 is a schematic side view illustrating an operation performed subsequently to the operation illustrated in FIG. 3.

After tack-welding of the resin pieces 16 held by the holding members 2A is performed, the resin pieces 16 for the next welding are supplied to and held by the first surface holding members 2B1, the resin pieces 16 for the next welding are supplied to the second surface guide members 52, the pairs of holding members 2A. 2B move, together with the rotary shafts L, from the nearby positions Q1 to the distant positions Q2, as illustrated in FIG. 4. At this time, the next electrode foil 11 to be welded is supplied to the supply position K from the external supply device.

In addition, the second surface holding members 2B2 in the receiving position PR receives the next resin pieces 16 from the second surface guide members 52. The suction plates 4 of the second surface holding members 2B2 moved to the distant positions Q2 are placed in contact with the resin pieces 16 placed on the bottom walls of the second surface guide members 52. These resin pieces 16 are delivered to the second surface holding member 2B2 with the resin pieces 16 held by the suction plates 4 of the second surface holding members 2B2. After the next resin pieces 16 are delivered to the second surface holding members 2B2, the holding members 2A having completed the tack-welding of the resin pieces 16 are shifted to the receiving position PR with the rotations of the rotary shafts L around the axes, and the holding members 2B holding the next resin pieces 16 are shifted to the welding position PW. Repeating the above operations produces the electrode foil 11 having resin pieces tack-welded successively.

The electrode foil 11 having resin pieces tack-welded are transferred to a welding device that performs final-welding by a transfer device (not illustrated). The welding device that performs final-welding welds the resin pieces 16 that are tack-welded to the sides of the electrode foil 11 throughout the sides of the electrode foil 11 continuously. At this time, the resin frame 12 is formed by welding part of the resin pieces 16 where the ends of the resin pieces 16 extending along the sides of the electrode foil 11 are overlapped with each other, so that the resin framed electrode foil 10 is produced.

As has been described, in this production device 1 for the resin framed electrode foil, when one of the pair of holding members 2A, 2B is in the welding position PW where the resin frame 12 is welded, the other of the pair of holding members 2A, 2B is in the receiving position PR where the resin frame 12 is received. Therefore, for example, when the holding member 2A, i.e., one of the holding members, is shifted to the receiving position PR after the holding member 2A welds the resin piece 16 to the electrode foil 11 in the welding position PW, the holding member 2B, i.e., the other of the holding members which is already in the receiving position PR, can quickly receive the resin piece 16 for the next welding. Accordingly, a cycle in which each of the pair of holding members 2A, 2B is shifted from the welding position PW to the receiving position PR is shortened, and the productivity in producing the resin framed electrode foil 10 may be improved.

In the present embodiment, the holding members 2A, 2B, which are paired, are connected to each other via the rotary shaft L that extends along the edge portion 11*a* of the electrode foil 11. With the rotation of the rotary shaft L around the axis, one of the pair of holding members 2A, 2B is shifted to the welding position PW, and the other of the pair of holding members 2A, 2B is shifted to the receiving position PR. This configuration using the rotary shaft L allows shifting the pair of holding members 2A, 2B between the welding position PW and the receiving position PR to be accomplished in a limited space, which allows the device to be downsized.

In the present embodiment, the pair of holding members 2A, 2B is provided for each of the four edge portions 11*a* of the electrode foil 11 to weld the resin piece 16 to each of the edge portions 11*a*. Thus, the pair of holding members 2A, 2B and the edge portions 11*a* are substantially the same in size. As a result, shifting the pair of holding members 2A, 2B between the welding position PW and the receiving position PR by the rotary shaft L may be accomplished in a more limited space, which allows the device to be downsized further.

In the present embodiment, the electrode foil 11 has the first surface 11*b* and the second surface 11*c* on the opposite from the first surface 11*b*, and the pair of holding members 2A, 2B is provided for each of the first surface 11*b* and the second surface 11*c*. The resin frames 12 disposed on the edge portions 11*a* of the electrode foil 11 on the first surface 11*b* side and the edge portions 11*a* of the electrode foil 11 on the second surface 11*c* side are held by one of the pair of first surface holding members 2A1, 2B1 (e.g. the holding member 2A1) in the welding position PW on the first surface 11*b* side and one of the pair of second surface holding members 2A2, 2B2 (e.g. the holding member 2A2) in the welding position PW on the second surface 11*c* side. In this case, when the resin frame 12 is being welded, opposite surfaces of the electrode foil 11 are held by the holding members 2A1, 2A2, which suppresses warping of the electrode foil 11.

In the present embodiment, the positions of the welding members 3 provided in one of the pair of first surface holding members 2A1, 2B1 (e.g. the holding member 2A1) in the welding position PW on the first surface 11*b* side, and the positions of the welding members 3 provided in one of the pair of second surface holding members 2A2, 2B2 (e.g. the holding member 2A2) in the welding position PW on the second surface 11*c* side are symmetric across the electrode foil 11. As a result, when the resin frame 12 is welded, heat is applied from the welding members 3 to the same parts of the electrode foil 11 on the opposite surfaces thereof, which increases the welding speed.

The present disclosure is not limited to the above-described embodiment.

For example, although the production device 1 is described as a device that performs tack-welding of the resin frame 12 to the electrode foil 11 as an example in the above-described embodiment, the production device for the resin framed electrode foil of the present disclosure may include a line heater as the welding member 3 extending along the edge portion 11*a* of the electrode foil 11, and be provided as a device that performs final-welding of the resin frame 12 to the electrode foil 11.

Although the resin pieces 16 are welded to the edge portions 11*a* of the electrode foil 11 on each of the first surface 11*b* side and the second surface 11*c* side in the above-described embodiment, the resin pieces 16 may be welded (that is, the pair of holding members 2A, 2B may be provided) to the edge portion 11*a* of the electrode foil 11 on only one of the first surface 11*b* side and the edge portion 11*a* of the electrode foil 11 on the second surface side 11*c*. Although the resin pieces 16 are welded to the four edge portions 11*a* of the electrode foil 11 simultaneously in the above-described embodiment, the resin pieces 16 may be welded to the four edge portions 11*a* of the electrode foil 11 one side or two sides at a time.

Although the pair of holding members 2A, 2B is disposed around an axis of the rotary shaft L extending along the edge portion 11*a* of the electrode foil 11 in the above-described embodiment, a moving mechanism that moves the pair of holding members 2A, 2B between the welding position PW and the receiving position PR may be provided by other configuration. A moving mechanism may be provided by, for example, a configuration in which the rotary shaft L extends along a thickness direction of the electrode foil 11 and the pair of holding members 2A, 2B is positioned rotation symmetric with respect to the rotary shaft L. A moving mechanism may be configured to slide the pair of holding members 2A, 2B in a surface direction of the electrode foil 11.

| Reference Signs List | |
|---|---|
| 1 | production device for resin framed electrode foil |
| 2 (2A, 2B) | holding member |
| 3 | welding member |
| 10 | resin framed electrode foil |
| 11 | electrode foil |
| 11a | edge portion |
| 11b | first surface |
| 11c | second surface |
| 12 | resin frame |

-continued

| Reference Signs List | |
|---|---|
| L | rotary shaft |
| PW | welding position |
| PR | receiving position |

The invention claimed is:

1. A production device for a resin framed electrode foil, which welds a resin frame to an edge portion of an electrode foil, the production device comprising:

a pair of holding members connected to each other via a rotary shaft extending along the edge portion of the electrode foil, and configured to hold the resin frame; and a welding member or a plurality of welding members provided in each of the pair of holding members, wherein each of the pair of holding members is movable between a receiving position in which the resin frame is received from an external supply device and a welding position in which the resin frame is welded to the edge portion of the electrode foil by the welding member, with rotation of the rotary shaft around an axis, when one of the pair of holding members is in the welding position, the other of the pair of the holding members is in the receiving position.

2. The production device for the resin framed electrode foil according to claim 1, wherein when the one of the pair of holding members welds the resin frame, the other of the pair of holding members receives the resin frame to be used at next welding from the external supply device.

3. The production device for the resin framed electrode foil according to claim 1, wherein the electrode foil has a first surface and a second surface opposite from the first surface, the pair of holding members comprises a plurality of pairs of holding members including a pair of first surface holding members on the first surface side and a pair of second surface holding members on the second surface side, the electrode foil, the resin frame on the edge portion of the electrode foil on the first surface side, and the resin frame on the edge portion of the electrode foil on the second surface side are held by one of the pair of first surface holding members in the welding position and one of the pair of second surface holding members in the welding position.

4. The production device for the resin framed electrode foil according to claim 3, wherein a position of the welding member in the one of the pair of the first surface holding members in the welding position, and a position of the welding member in the one of the pair of second surface holding members in the welding position are symmetric across the electrode foil.

* * * * *